United States Patent
Nishino et al.

(10) Patent No.: US 8,991,993 B2
(45) Date of Patent: Mar. 31, 2015

(54) INK, INK CARTRIDGE, AND INKJET RECORDING METHOD

(71) Applicant: Canon Kabushiki Kaisha, Tokyo (JP)

(72) Inventors: Yuki Nishino, Kawasaki (JP); Shin-ichi Hakamada, Kawasaki (JP); Kousuke Yamasaki, Kawasaki (JP); Kenichi Shiiba, Warabi (JP); Daiji Okamura, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/888,142

(22) Filed: May 6, 2013

(65) Prior Publication Data

US 2013/0300810 A1    Nov. 14, 2013

(30) Foreign Application Priority Data

May 9, 2012 (JP) .................................. 2012-107782

(51) Int. Cl.
*G01D 11/00* (2006.01)
*C09D 11/00* (2014.01)
*C09D 11/30* (2014.01)
*B41J 2/175* (2006.01)
*C09D 11/324* (2014.01)

(52) U.S. Cl.
CPC ............. *C09D 11/30* (2013.01); *B41J 2/17503* (2013.01); *C09D 11/324* (2013.01)
USPC .......................................... 347/100; 106/31.13

(58) Field of Classification Search
USPC ...................... 347/56, 86, 100; 524/377, 507; 106/31.13; 523/160
See application file for complete search history.

(56) References Cited

U.S. PATENT DOCUMENTS

| | | | |
|---|---|---|---|
| 7,833,336 B2* | 11/2010 | Valentini ..................... | 106/31.75 |
| 2009/0155465 A1 | 6/2009 | Szajewski et al. | |
| 2010/0309260 A1* | 12/2010 | Hakiri et al. .................... | 347/56 |
| 2011/0143040 A1 | 6/2011 | Yamasaki et al. | |
| 2013/0300805 A1* | 11/2013 | Hakamada et al. ............. | 347/56 |

FOREIGN PATENT DOCUMENTS

| | | |
|---|---|---|
| JP | 2004-010870 A | 1/2004 |
| JP | 2005-515289 A | 5/2005 |
| WO | 2003/062331 A | 7/2003 |

\* cited by examiner

*Primary Examiner* — Anh T Vo
(74) *Attorney, Agent, or Firm* — Canon U.S.A. Inc., IP Division

(57) ABSTRACT

An ink used for an inkjet recording method for discharging the ink from a recording head by an action of thermal energy contains self-dispersing carbon black, a polyurethane polymer having an acid value of 40 mg KOH/g or more, and polyethylene glycol.

15 Claims, 2 Drawing Sheets

INK, INK CARTRIDGE, AND INKJET RECORDING METHOD

BACKGROUND OF THE INVENTION

1. Field of the Invention

The present invention relates to an ink, an ink cartridge having such an ink, and an inkjet recording method using such an ink.

2. Description of the Related Art

In recent years, inkjet recording apparatuses have had increased opportunities to be used in business fields with enhancement of their image quality and recording speed. Performances required for the ink for inkjet used in the business field include reliability of the ink (jetting stability and the like), the image quality (high image density, feathering resistance and the like), and fastness of images (scratch resistance, highlighter resistance, water resistance and the like). Among these performances, the inks using a self-dispersing pigment rather than a polymer-dispersing pigment to enhance an optical density of an image and further containing a polyurethane polymer to enhance the highlighter resistance on the image have been studied [Japanese Patent Application Laid-Open (Translation of PCT Application) No. 2005-515289]. In Japanese Patent Application Laid-Open No. 2005-515289, it is described that the highlighter resistance on the image is improved by an aqueous inkjet ink containing the polyurethane polymer having an acid group and the self-dispersing pigment.

Meanwhile, in Japanese Patent Application Laid-Open No. 2004-010870, it is described that glossiness and fastness of the image and storage stability and discharge stability of the ink are improved by the ink containing the self-dispersing pigment, polymer fine particles, and an ethylene oxide/propylene oxide block type polymer surfactant.

SUMMARY OF THE INVENTION

Aspects of the present invention are directed to an ink that has the high discharge stability of the ink and balances the optical density and the fastness of the obtained image at high levels even when recording is conducted at a high speed in an inkjet recording method in which an ink is discharged from a recording head by an action of thermal energy. Aspects of the present invention are also directed to an ink cartridge having the above ink and an inkjet recording method using the above ink.

According to an aspect of the present invention, an ink used for an inkjet recording method for discharging the ink from a recording head by an action of thermal energy contains self-dispersing carbon black, a polyurethane polymer having an acid value of 40 mg KOH/g or more, and polyethylene glycol.

According to an exemplary embodiment of the present invention, it is possible to provide the ink that balances the discharge stability of the ink, the optical density and the fastness of the obtained image at high levels. According to other exemplary embodiments of the present invention, an ink cartridge and an inkjet recording method using the ink can be provided.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Figure 1:
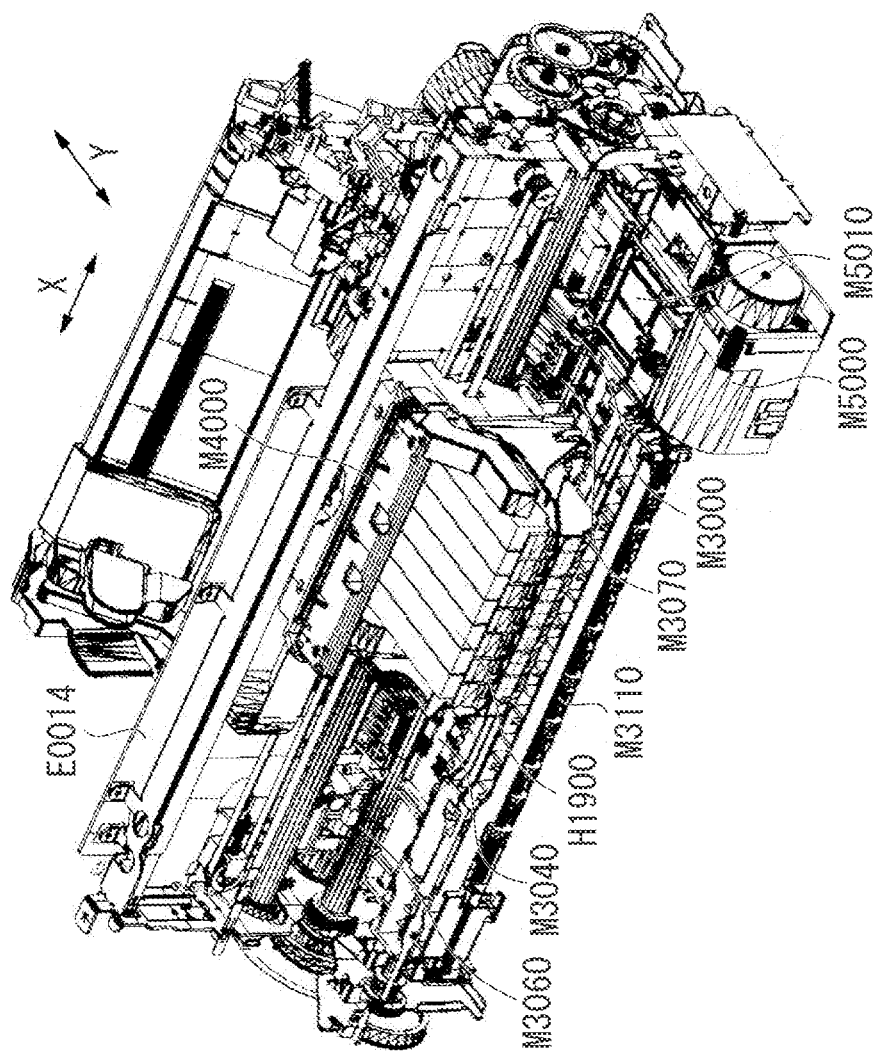
FIG. 1 is a perspective view illustrating a machinery section of an inkjet recording apparatus.

Various exemplary embodiments, features, and aspects of the invention will be described in detail below with reference to the drawings.

However, as a result of the study by the present inventors, it was found that when the ink described in Japanese Patent Application Laid-Open No. 2005-515289 was used for an inkjet recording method in which the ink was discharged from a recording head by giving thermal energy to the ink, the highlighter resistance on the image was high, but a sufficient discharge stability of the ink was not obtained because an acid value of the polyurethane polymer was 20 to 30 mg KOH/g, which was low.

Thus, when a polyurethane polymer having an acid value of 40 mg KOH/g or more was used as a polyurethane polymer having hydrophilicity that was high to some extent, the discharge stability of the ink was improved, and the discharge stability and the highlighter resistance were able be balanced.

The present inventors also extensively studied dispersion systems and types of the pigments in order to obtain the image with high quality as required in the business field, and found that it was important to use self-dispersing carbon black.

Then, the present inventors examined that an ink containing the self-dispersing carbon black to obtain the image with high quality and containing the polyurethane polymer having an acid value of 40 mg KOH/g or more to improve the highlighter resistance on the image was applied to the recording at a high recording speed as required in the business field. Consequently, phenomena where stripes were observed on recorded matters and images of ruled lines were distorted were observed were affirmed, and the discharge stability of the ink was reduced.

Meanwhile, it was found that the ink described in Japanese Patent Application Laid-Open No. 2004-010870 did not satisfy the required level although the discharge stability of the ink was improved. An optical density of the image was low.

The present inventors first examined why the discharge stability of an ink was reduced when the ink containing self-dispersing carbon black and a polyurethane polymer having an acid value of 40 mg KOH/g or more was used to record at a high recording speed in the inkjet recording method in which the ink is discharged from the recording head by an action of thermal energy (hereinafter, also referred to as a "thermal inkjet recording method").

The present inventors observed a heater board of the recording head under an optical microscope after recording at a high speed using the ink containing the self-dispersing carbon black and the polyurethane polymer having an acid value of 40 mg KOH/g or more in the thermal inkjet recording method, and it was found that the decomposed pigment and polyurethane polymer were deposited on the heater board. It was also found that these adhered depositions can also occur upon recording at an ordinary recording speed but a discharge speed of the ink was reduced only when recording at a high speed. This mechanism is shown below.

A discharge direction of an ink droplet is influenced by a discharge speed of the ink droplet and a recording speed, i.e., a moving speed of a carriage. When the discharge speed of the ink droplet is sufficiently high, the influence given by the moving speed of the carriage becomes negligible. Thus, the ink droplet is discharged in a direction perpendicular to a discharge port surface. However, when the discharge speed of the ink droplet is low, the influence by the moving speed of the carriage is given, and the discharge direction of the ink droplet shifts from the direction perpendicular to the discharge port surface. As described above, when the pigment and the polyurethane polymer are deposited on the heater board, the energy upon discharge of the ink is weakened and the discharge speed of the ink is reduced. Thus, when the recording is conducted at a higher moving speed of the carriage than a conventional speed, the discharge direction of the ink droplet prominently shifts from an intended direction, and this phenomenon is recognized as the phenomena where the stripes were observed on the recorded matters and the images of the ruled lines are distorted.

Subsequently, the present inventors examined why the deposition occurs on the heater board and how to solve it as follows.

The present inventors prepared inks A to E containing polymers (polyurethane polymer having an acid value of 40 mg KOH/g or more and acryl polymer having an acid value of 40 mg KOH/g or more) and pigments (self-dispersing carbon black and self-dispersing organic pigment) in combination shown in Table 1. An ink cartridge was filled with each ink, and mounted in an inkjet recording apparatus, PIXUS iP3100 (manufactured by Canon Inc.), which discharged the ink from the recording head by giving thermal energy to the ink and had been modified so that the moving speed of the carriage became 2 times. Then, images were recorded on recording media. The heater board of the recording head was observed under the optical microscope after recording the images.

TABLE 1

Preparation condition of inks A to E

| Ink No. | Polymer | | Pigment | |
|---|---|---|---|---|
| | Polyurethane polymer having acid value of 40 mg KOH/g or more | Acryl polymer having acid value of 40 mg KOH/g or more*[1] | Self-dispersing carbon black | Self-dispersing organic pigment*[2] |
| Ink A | Presence | — | — | — |
| Ink B | — | — | Presence | — |
| Ink C | Presence | — | Presence | — |
| Ink D | — | Presence | Presence | — |
| Ink E | Presence | — | — | Presence |

*[1]Joncryl 683 (manufactured by BASF; styrene/acrylic acid copolymer)
*[2]Cab-O-Jet260M (manufactured by Cabot; magenta pigment)

The inks A to C had the following results. In the case of the ink A, no decomposed polyurethane polymer was observed on the heater board. In the case of the ink B, although the carbon black was adhered onto the heater board, no phenomenon where the stripes were observed on the recorded matters and the image of the ruled lines was distorted was affirmed. On the other hand, in the case of the ink C, not only the carbon black but also the polyurethane polymer was deposited on the heater board. Further, an amount of the deposited carbon black on the heater board was larger than in the case of the ink B. Concerning why the inks are different in adhered/deposited matters on the heater board of the recording head and discharge stability of the ink, the present inventors have speculated as follows.

When the thermal energy is given to the ink containing the self-dispersing carbon black, the carbon black itself having a very high thermal decomposition temperature is not decomposed, but a part of a compound having a hydrophilic group that contributes to the dispersion of the carbon black is decomposed. Thus the carbon black loses hydrophilicity and adheres to the heater board. Subsequently, each time when the ink is discharged, the carbon black that lost the hydrophilicity occurs. At that time, in the case of the ink B, the carbon black that lost the hydrophilicity is not deposited anymore on the carbon black adhered to the heater board, and discharged together with the ink. This is believed to be because a cohesive force of the carbon black particles one another in the ink B is not stronger than a cohesive force between the heater board and the carbon black. Therefore, in the case of the ink B, the carbon black adheres to only the surface of the heater board, but is not deposited anymore, and gives no large effect on the discharge speed of the ink droplet. Thus, the discharge stability of the ink is not reduced.

In the case of the ink C, it was found that the carbon black that had lost the hydrophilicity was not discharged together with the ink and was deposited on the carbon black adhered to the heater board. This is believed to be because the cohesive force of the carbon black particles one another is enhanced by the polyurethane polymer adsorbed onto the surface of the carbon black. It is thought that the discharge speed of the ink droplet is reduced and the discharge stability of the ink is reduced by the carbon black and the polyurethane polymer deposited as above.

Meanwhile, the inks D and E had the following results. In the case of the ink D, just like the case of the ink B, although the carbon black was adhered onto the surface of the heater board, no decomposed acryl polymer was affirmed. In the case of the ink E, just like the case of the ink A, it was not identified that the pigment and the polyurethane polymer were adhered and deposited on the heater board. Thus, in the inks D and E, no phenomenon where the stripes were observed on the recorder matters and the images of the ruled lines were distorted was identified.

The ink D contains the carbon black, and thus the carbon black that lost the hydrophilicity adheres onto the heater board. The acryl polymer is adsorbed to the surface of the carbon black, but has a weaker action to cohere the carbon black particles one another than the polyurethane polymer in the ink C. This difference is believed to be due to the difference of viscosity that these polymers have. The polyurethane polymer has a strong intermolecular interaction by a hydrogen bond between a hydrogen atom and a nitrogen atom. Thus, the polyurethane polymer has the higher viscosity than the acryl polymer. As a result from above, in the ink D, the carbon black that lost the hydrophilicity is not deposited anymore on the carbon black adhered onto the heater board, and is discharged together with the ink.

The ink E contains the organic pigment. The thermal decomposition temperature of the organic pigment is lower than that of the carbon black. Thus, when the thermal energy is given to the ink, the organic pigment is partially decomposed. A size of the decomposed organic pigment is very small. Thus, the decomposed organic pigment is discharged together with the ink, and not even adhered onto the heater board of the recording head.

From the above results, it was found that the technical problem that the discharge stability of the ink was reduced occurred when the ink containing both the polyurethane polymer having an acid value of 40 mg KOH/g or more and the self-dispersing carbon black like the ink C was discharged by the thermal inkjet recording method.

Then, the present inventors further used an ethylene oxide/propylene oxide block copolymer surfactant in the ink containing both the polyurethane polymer having an acid value of 40 mg KOH/g or more and the self-dispersing carbon black with reference to Japanese Patent Application Laid-Open No. 2004-010870. However, the discharge stability of the ink was not largely improved as described above. A more amount of the copolymer surfactant was adsorbed to the carbon black, thereby reducing aggregability of the carbon black on the recording medium. Thus, the optical density of the image was reduced.

Thus, the present inventors studied the ink that had the higher fastness of the image by the use of the polyurethane polymer and further was more excellent in discharge stability of the ink and optical density of the image. As a result, the present inventors reached the configuration of the present invention where polyethylene glycol was further contained in the ink containing both the polyurethane polymer having an acid value of 40 mg KOH/g or more and the self-dispersing carbon black. A mechanism in which the effect is obtained by this configuration is described in detail below.

As described above, the polyurethane polymer has the very high viscosity because an intermolecular interaction by a hydrogen bond between a hydrogen atom and a nitrogen atom is strong. Thus, the technical problem that the discharge stability of the ink is reduced is caused by cohering the self-dispersing carbon black particles one another adhered onto the heater surface of the recording head with this viscosity.

As described above, the polyurethane polymer causes the technical problem that the discharge stability of the ink is reduced by cohering and depositing the carbon black particles one another on the heater board with its high viscosity. According to the study by the present inventors, it was found that the action of the polyurethane polymer to cohere the carbon black particles was weakened and the discharge stability of the ink was enhanced when polyethylene glycol is further contained in such an ink. This is because the intermolecular interaction of the polyurethane polymer is weakened by making the hydrogen bond between the oxygen atom in polyethylene glycol and the hydrogen atom in the polyurethane polymer to reduce the viscosity of the polyurethane polymer. As a result, the carbon black that lost the hydrophilicity is not deposited anymore on the carbon black adhered on the heater board, and discharged together with the ink. Thus, the discharge speed of the ink droplet is not largely influenced, and the discharge stability of the ink is not reduced. Polyethylene glycol is highly soluble in water, and is not abundantly adsorbed to the self-dispersing carbon black. Thus, the optical density of the image is not reduced in contrast to the case of using the above polymer surfactant.

As in the above mechanism, respective configurations synergistically interact, thereby becoming capable of accomplishing the effect of the present invention.

[Ink]

Each ingredient that composes the ink according to an exemplary embodiment of the present invention will be described below.

<Polyurethane Polymer>

The polyurethane polymer used in the ink according to the present exemplary embodiment will be described in detail below.

(Polyisocyanate)

In the present exemplary embodiment, the polyurethane polymer desirably has a unit derived from polyisocyanate. "Polyisocyanate" in the present exemplary embodiment means a compound having two or more isocyanate groups. Polyisocyanate that can be used in the present exemplary embodiment specifically includes aliphatic polyisocyanate, alicyclic polyisocyanate, aromatic polyisocyanate, and aromatic aliphatic polyisocyanate. A percentage (% by mass) of the unit derived from polyisocyanate in the polyurethane polymer is desirably 10% by mass or more and 80% by mass or less.

Aliphatic polyisocyanate includes tetramethylene diisocyanate, dodecamethylene diisocyanate, hexamethylene diisocyanate, 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate. Alicyclic polyisocyanate includes isophorone diisocyanate, hydrogenated xylylene diisocyanate, dicyclohexylmethane 4,4'-diisocyanate, 1,4-cyclohexane diisocyanate, methylcyclohexylene diisocyanate, and 1,3-bis (isocyanate methyl)cyclohexane. Aromatic polyisocyanate includes tolylene diisocyanate, 2,2'-diphenylmethane diisocyanate, 2,4'-diphenylmethane diisocyanate, 4,4'-diphenylmethane diisocyanate, 4,4'-dibenzyl diisocyanate, 1,5-naphthylene diisocyanate, xylylene diisocyanate, 1,3-phenylene diisocyanate, and 1,4-phenylene diisocyanate. Aromatic aliphatic polyisocyanate includes dialkyl diphenylmethane diisocyanate, tetraalkyl diphenylmethane diisocyanate, and α,α,α,α-tetramethyl xylylene diisocyanate. These polyisocyanates can be used alone or in combination of two or more as needed. In the present exemplary embodiment, it is desirable to use at least one selected from isophorone diisocyanate, hexamethylene diisocyanate, and dicyclohexylmethane 4,4'-diisocyanate among the above polyisocyanates.

(Polyol)

The polyurethane polymer used in the ink of the present exemplary embodiment desirably has a unit derived from polyol. "Polyol" in the present exemplary embodiment means a compound having two or more hydroxyl groups. Polyol includes polyester polyol, polyether polyol, polycarbonate diol, and other polyols (e.g., polyhydroxy polyacetal, polyhydroxy polyacrylate, polyhydroxy polyester amide, polyhydroxy polythioether and the like). These polyols can be used alone or in combination of two or more as needed. In the present exemplary embodiment, polyol desirably has 10 or more carbon atoms. It is also desirable to have no acid group in the molecule. A number average molecular weight of polyol is desirably 600 or more and 4,000 or less. When the number average molecular weight is less than 600, flexibility of a membrane becomes low and the fastness of the image is not sufficiently enhanced in some cases. When it is more than 4,000, the flexibility of the membrane becomes excessively high and the fastness of the image is not sufficiently enhanced in some cases.

Polyester polyol includes, for example, esters of an acid ingredient with polyalkylene glycol and polyvalent alcohol such as bivalent alcohol or trivalent or more alcohol. The acid ingredient that composes polyester polyol includes aromatic dicarboxylic acids, alicyclic dicarboxylic acids, and aliphatic dicarboxylic acids. The aromatic dicarboxylic acids include an isophthalic acid, a terephthalic acid, an orthophthalic acid, a naphthalene dicarboxylic acid, biphenyl dicarboxylic acid and a tetrahydrophthalic acid. The alicyclic dicarboxylic acid includes hydrogenated products of the aromatic dicarboxylic acids. The aliphatic dicarboxylic acid includes a malonic acid, a succinic acid, a tartaric acid, an oxalic acid, a glutaric acid, an adipic acid, a pimelic acid, a suberic acid, an azelaic acid, a sebacic acid, an alkylsuccinic acid, a maleic acid, a fumaric acid, a mesaconic acid, a citraconic acid, and an itaconic acid. Reactive derivatives thereof such as acid anhydrides, alkyl esters and acid halides of these acid ingredients can also be used as the acid ingredient that composes the polyester polyol. The above acid ingredient that composes the polyester polyol can be used alone or in combination of two or more as needed.

Meanwhile, the polyalkylene glycol includes polyethylene glycol, polypropylene glycol, polytetramethylene glycol, and ethylene glycol/propylene glycol copolymers. The bivalent alcohol includes hexamethylene glycol, tetramethylene glycol, ethylene glycol, diethylene glycol, propylene glycol, dipropylene glycol, 1,3-butanediol, 1,4-butanediol, 4,4-dihydroxydiphenylpropane, and 4,4-dihydroxyphenylmethane. The polyvalent alcohol such as trivalent or more alcohol includes glycerin, trimethylolpropane, 1,2,5-hexanetriol, 1,2,6-hexanetriol and pentaerythritol. These polyester polyols can be used alone or in combination of two or more as needed.

Polyether polyol includes, for example, products obtained by addition polymerization of polyalkylene glycol and alkylene oxide with polyvalent alcohol such as bivalent alcohol or trivalent or more alcohol. The alkylene oxide includes ethylene oxide, propylene oxide, butylene oxide and α-olefin oxide. The polyalkylene glycol and polyvalent alcohol such as bivalent alcohol or trivalent or more alcohol includes those exemplified as the ingredients that compose the polyester polyol. These polyether polyols can be used alone or in combination of two or more as needed.

Polycarbonate diol produced by known methods can be used as polycarbonate diol. For example, polyhexamethylene carbonate diol that is hexanediol-based polycarbonate diol is included. Polycarbonate diol obtained by reacting a carbonate ingredient such as alkylene carbonate, diaryl carbonate and dialkyl carbonate or phosgene with an aliphatic diol ingredient is also included. These polycarbonate diols can be used alone or in combination of two or more as needed.

In the present exemplary embodiment, it is particularly desirable to use polyether polyol among the polyols. The flexibility of the polyurethane polymer is appropriately elicited by use of polyether polyol. Thus the fastness of the image is enhanced. Further, polyether polyol is relatively highly soluble in water, and thus is also excellent in discharge stability of the ink. It is particularly desirable to use polypropylene glycol among polyether polyols. It was confirmed by the study by the present inventors that when polypropylene glycol is used, the water solubility of the polyurethane polymer was enhanced and the discharge stability of the ink was further improved. The percentage (% by mass) of the unit derived from polyol in the polyurethane polymer is desirably 5.0% by mass or more and 60% by mass or less.

(Diol Having Acid Group)

The polyurethane polymer used in the ink of the present exemplary embodiment desirably has a unit derived from diol having an acid group. "Diol having the acid group" in the present exemplary embodiment means diol having the acid group such as a carboxyl group, a sulfonate group and a phosphate group. In the present exemplary embodiment, diol having the acid group desirably has carbon atoms of less than 10. Diol having the acid group may be present in the form of an alkali metal salt with Li, Na, K or the like or an organic amine salt with ammonia, dimethylamine or the like. It is desirable to use dimethylol propionate and dimethylol butanoate as the diol having the acid group. These may be used alone or in combination of two or more as needed. The percentage (% by mass) of the unit derived from diol having the acid group is desirably 5.0% by mass or more and 40.0% by mass or more in the polyurethane polymer.

(Chain Extender)

In the present exemplary embodiment, a chain extender may be used when the polyurethane polymer is synthesized. The chain extender is a compound that reacts with a remaining isocyanate group that did not form a urethane bond among polyisocyanate units in a urethane prepolymer. The chain extender includes, for example, trimethylol melamine and derivatives thereof, dimethylol urea and derivatives thereof, polyvalent amine compounds such as dimethylolethylamine, diethanol/methylamine, dipropanolethylamine, dibutanolethylamine, ethylenediamine, propylenediamine, diethylenetriamine, hexylenediamine, triethylenetetraamine, tetraethylenepentamine, isophorone diamine, xylylene diamine, diphenylmethane diamine, hydrogenated diphenylmethane diamine, and hydrazine; polyamide polyamine, and polyethylene polyimine. The chain extender also includes ethylene glycol, propylene glycol, 1,3-propanediol, 1,3-butanediol, 1,4-butanediol, 1,5-pentanediol, 1,6-hexanediol, neopentyl glycol, diethylene glycol, triethylene glycol, tetraethylene glycol, dipropylene glycol, tripropylene glycol, polyethylene glycol, 3-methyl-1,5-pentanediol, 2-butyl-2-ethyl-1,3-propanediol, 1,4-cyclohexanediol, 1,4-cyclohexanedimethanol, hydrogenated bisphenol A, glycerin, trimethylolpropane and pentaerythritol. These chain extenders can be used alone or in combination of two or more as needed.

(Characteristics of Polyurethane Polymer)

In the present exemplary embodiment, the acid value of the polyurethane polymer is necessary to be 40 mg KOH/g or more as described above. Further, the acid value is desirably 140 mg KOH/g or less. When the acid value is larger than 140 mg KOH/g, the polyurethane polymer becomes rigid and the fastness of the image is not sufficiently enhanced in some cases.

In the present exemplary embodiment, a content (% by mass) of the polyurethane polymer is desirably 0.1% by mass or more and 10.0% by mass or less, and more desirably 0.5% by mass or more and 1.5% by mass or less based on a total mass of the ink. The fastness of the image can be obtained at higher level by making the content 0.5% by mass or more. The discharge stability of the ink is also obtained at higher level by making the content 1.5% by mass or less.

The content (% by mass) of the polyurethane polymer in the ink is desirably 0.05 times or more and 2.00 times or less and more desirably 0.1 time or more and 0.4 times or less as a mass ratio relative to the content (% by mass) of the pigment based on the total mass of the ink. The fastness of the image is obtained at higher level by making the mass ratio 0.1 time or more. The discharge stability of the ink is also obtained at higher level by making the mass ratio 0.4 times or less.

A weight average molecular weight (Mw) in terms of polystyrene obtained by GPC in the polyurethane polymer used in the ink of the present exemplary embodiment is desirably more than 30,000 and 150,000 or less. When the weight average molecular weight is 30,000 or less, strength of the polyurethane polymer becomes low and the fastness of the image is not sufficiently enhanced in some cases. When it is more than 150,000, the viscosity of the ink easily increases and the discharge stability of the ink is not sufficiently enhanced in some cases.

(Method of Synthesizing Polyurethane Polymer)

Any method used conventionally and generally can be used as a method of synthesizing the polyurethane polymer in the present exemplary embodiment. For example, the following method is included. Polyisocyanate, polyol having no acid group and diol having the acid group are reacted to synthesize a urethane prepolymer having an isocyanate group at its molecular end. Subsequently, the acid group in the above urethane prepolymer is neutralized by a neutralizing agent. Then, this neutralized urethane prepolymer is added to an aqueous solution containing the chain extender and reacted therewith. Subsequently, when an organic solvent is contained in the system, it can be removed to obtain the polyurethane polymer.

(Method of Analyzing Polyurethane Polymer)

The polyurethane polymer can be analyzed in a state of being contained in the ink, but the accuracy is further enhanced by extracting the polyurethane polymer from the ink. Specifically, a sample obtained by centrifuging the ink at 80,000 rpm, precipitating a solution other than solid contents with an acid such as a hydrochloric acid, and drying the precipitate is used. The polyurethane polymer is contained in this sample. Thus, a composition, the acid value and the molecular weight of the polyurethane polymer can be analyzed using this sample by the following method.

(1) Composition of Polyurethane Polymer

The composition of the polyurethane polymer (types of polyisocyanate, polyether polyol having no acid group and diol having the acid group) can be identified by determining peak positions of chemical shift obtained by dissolving the sample obtained above in deuterated dimethylsulfoxide (deuterated DMSO) and measuring the solution using a proton nuclear magnetic resonance method ($^1$H-NMR) or by measuring the sample obtained above by thermal decomposition gas chromatography. Further, each composition ratio can be calculated from a ratio of integrated values of the peaks in the chemical shift. A repeating number of polyether polyol having no acid group can be calculated and its number average molecular weight can be calculated by dissolving the sample obtained above in deuterated DMSO and measuring the solution by a carbon nuclear magnetic resonance method ($^{13}$C-NMR).

(2) Method of Measuring Acid Value of Polyurethane Polymer

The acid value of the polyurethane polymer can be measured by a titration method. In the present exemplary embodiment, the acid value of the polymer was determined by dissolving the polymer in THF and titrating a potential difference by a potassium hydroxide ethanol titration solution using a potential difference automatic titration apparatus AT 510 (manufactured by Kyoto Electronics Manufacturing Co., Ltd.).

(3) Method of Measuring Average Molecular Weight of Polyurethane Polymer

An average molecular weight of the polyurethane polymer can be measured by GPC. In the present exemplary embodiment, the average molecular weight was calculated by performing GPC measurement using an apparatus: Alliance GPC 2695 (manufactured by Waters), a column: Sephadex KF-806M quadruplicate column (manufactured by Showa Denko K.K.) and a detector: RI (refractive index) and using PS-1 and PS-2 (manufactured by Polymer Laboratories) as polystyrene standard samples.

<Self-Dispersing Carbon Black>

In the present exemplary embodiment, the self-dispersing carbon black (hereinafter, also referred to as the carbon black simply) includes those in which a hydrophilic group is bound to the surface of the carbon black particle directly or via another atomic group. The hydrophilic groups in the ink may be partially dissociated or entirely dissociated.

In the present exemplary embodiment, it is verified as follows whether the carbon black contained in the ink is self-dispersing or not. Specifically, the ink is precipitated with an acid and then centrifuged to collect a precipitate. In the case of a pigment dispersion, the pigment dispersion is precipitated with the acid, and the precipitate is collected. The collected precipitate is placed in a petri dish, water is added thereto, and the precipitate is dispersed again by stirring. After leaving stand for one day, if no precipitate occurs in the petri dish and the pigment is dispersed, then the carbon black is determined to be self-dispersing.

In the present exemplary embodiment, the content (% by mass) of the carbon black in the ink is desirably 0.1% by mass or more and 15.0% by mass or less and more desirably 1.0% by mass or more and 10.0% by mass or less based on the total mass of the ink.

In the present exemplary embodiment, an average particle diameter (average particle diameter based on volume $D_{50}$) of the carbon black used in the ink is desirably 50 nm or more and 150 nm or less. In Example described below, the average particle diameter of the pigment was measured using Microtrack UPA-EX50 (manufactured by Nikkiso Co., Ltd.).

Any carbon black used conventionally and generally in the ink for the inkjet can be used as the carbon black used in the ink used in the present exemplary embodiment. Specifically examples thereof include furnace black, acetylene black, channel black, thermal black, and lamp black. More specifically, it is possible to use the following commercially available carbon blacks: Raven: 7000, 5750, 5250, 5000ULTRA, 3500, 2000, 1500, 1255, 1250, 1200, 1190ULTRA-II, 1170 (manufactured by Colombia); Monac: 700, 800, 880, 900, 1000, 1100, 1300, 1400, 2000 (manufactured by Cabot); Black Pearls: 880, 800, L (manufactured by Cabot); Color Black FW1, FW2, FW2V, FW18, FW200, S150, S160, S170 (manufactured by Degussa); Printex 85, 95, 140U, 140V, U, V (manufactured by Degussa); Special Black: 6, 5, 4A, 4 (manufactured by Degussa); and No. 900, No. 1000, No. 220B, No. 2300, No. 2350, No. 2400R, MCF-88 (manufactured by Mitsubishi Chemical Corporation). Carbon black newly prepared for the present exemplary embodiment can of course be used.

In the present exemplary embodiment, the hydrophilic group chemically bound to the surface of the carbon black directly or via another atomic group includes, for example, COOM, $SO_3M$, $PO_3HM$, $PO_3M_2$, $SO_2NH_2$ and $SO_2NHCOR$ groups. In the above formulae, M represents a hydrogen atom, an alkali metal, ammonium, or organic ammonium.

A method of binding the hydrophilic group to the surface of the carbon black includes a method of giving an oxidation treatment with sodium hypochlorite to the carbon black, a method of oxidizing the carbon black by the treatment with ozone in water, and a method of modifying the surface of the carbon black by treating with ozone followed by giving a wet oxidization with an oxidant.

According to the study by the present inventors, it was found that it was desirable to adsorb the more amount of the acryl polymer to the surface of the carbon black in order to enhance the discharge stability of the ink containing the polyurethane polymer. Specifically, a method of adsorbing the more amount of the acryl polymer to the surface of the carbon black includes a method of using the acryl polymer having the small acid value and a method of reducing the number of hydrophilic groups bound to the surface of the carbon black. Phosphonate groups such as $PO_3HM$ and $PO_3M_2$ groups are more desirable than the other hydrophilic groups because the number of hydrophilic groups bound to the surface of the carbon black can be reduced.

It can be verified by an ICP luminescence analysis apparatus whether the hydrophilic group in the self-dispersing carbon black is the phosphonate group or not. Specifically, if a phosphorus element is identified using the ICP luminescence analysis apparatus, it is determined that the carbon black has the phosphonate group. Further, the phosphonate group desirably has a structure of $—CQ(PO_3M_2)_2$. In this formula, Q represents a hydrogen atom, R', OR', SR' or NR'$_2$, and R' each independently represents a hydrogen atom, an alkyl group, an acyl group, an aralkyl group, or an aryl group. When R' is a group containing carbon atoms, the group desirably contains 1 to 18 carbon atoms. Specifically, the alkyl group includes methyl, ethyl and the like; the acyl group includes acetyl, benzoyl and the like; the aralkyl group includes benzyl and the like; and the aryl group includes phenyl, naphthyl and the like. In the present exemplary embodiment, —CH(PO$_3$M$_2$)$_2$ where R' is the hydrogen atom is particularly desirable among them. The other atomic groups (—R—) include an amide group, an amino group, a ketone group, an ester group, an ether group, an alkylene group having 1 to 12 carbon atoms, a substituted or unsubstituted phenylene group, or a substituted or unsubstituted naphthylene group, and the like. According to study by the present invention, the molecular weight of —R— is desirably 1,000 or less. In the present exemplary embodiment, —R— desirably contains a benzamide group (—C$_6$H$_4$—CONH—) among them. Also in the present exemplary embodiment, a plurality of the phosphonate groups may be bound to the carbon atom of the other atomic group (—R—). Specifically, the self-dispersing carbon black, the surface of which a bisphosphonate group or a triphosphonate group has been bound to via the atomic group is included. Among them, the self-dispersing carbon black to which the bisphosphonate group has been bound via the atomic group is desirable in terms of optical density of the image.

The present inventors further studied. When the self-dispersing carbon black to which the bisphosphonate group has been bound via the atomic group is used, a surface charge amount is desirably 0.60 mmol/g or less and more desirably 0.38 mmol/g or less. When the surface charge amount is too low, a dispersed state of the pigment becomes instable, and the storage stability of the ink is not sufficiently obtained in some cases. Thus, the surface charge amount is desirably 0.10 mmol/g or more. In the present exemplary embodiment, the surface charge amount of the self-dispersing carbon black is obtained by colloid titration. In Example described below, the surface charge amount of the pigment in the pigment dispersion was determined by the colloid titration utilizing the potential difference using the potential difference automatic titration apparatus (AT 510 manufactured by Kyoto Electronics Manufacturing Co., Ltd.) in which a fluid potential titration unit (PCD-500) was mounted. At that time, methyl glycol chitosan was used as a titration reagent. It is also of course possible to measure the surface charge amount using the pigment extracted from the ink by an appropriate method. Also if necessary, a pigment concentration in the ink may be adjusted with water.

<Polyethylene Glycol>

The ink of the present exemplary embodiment contains polyethylene glycol. The content (% by mass) of the polyethylene glycol in ink is desirably 0.1% by mass or more and 3.0% by mass or less based on the total mass of the ink.

The content (% by mass) of polyethylene glycol in the ink is also desirably 0.10 time or more and 2.00 times or less as the mass ratio relative to the content (% by mass) of the polyurethane polymer based on the total mass of the ink. By falling the content in this range, the effect of polyethylene glycol to reduce the viscosity of the polyurethane polymer is elicited more effectively. Further, the number average molecular weight of polyethylene glycol is desirably 500 or more and 3,000 or less. The number average molecular weight of polyethylene glycol can be determined by calculating the repeating number of polyethylene glycol by centrifuging the ink, collecting its supernatant, drying the supernatant, dissolving a residue in deuterated DMSO and measuring using the carbon nuclear magnetic resonance method ($^{13}$C-NMR).

<Water Soluble Organic Compound Other than Polyethylene Glycol>

The ink of the present exemplary embodiment can contain a water-soluble organic compound other than polyethylene glycol. The content (% by mass) of the all water-soluble organic compounds (including polyethylene glycol) is desirably 3.0% by mass or more and 50.0% by mass or less based on the total mass of the ink. The water-soluble organic compound may be a liquid or a solid at ambient temperature, and any one conventionally and generally used can be used. For example, the water-soluble organic compound may include alcohols, glycols, alkylene glycols where the alkylene group has 2 to 6 carbon atoms, nitrogen-containing compounds and sulfur-containing compounds. These water-soluble organic compounds can be used alone or in combination of two or more as needed.

<Water>

The ink in the present exemplary embodiment can contain water. It is desirable to use deionized water (ion exchanged water) as the water. The content (% by mass) of the water in the ink is desirably 50.0% by mass or more and 95.0% by mass or less based on the total mass of the ink.

<Other Ingredients>

Various additives such as surfactants, pH adjusters, anti-corrosion agents, preservatives, antimicrobial agents, antioxidants, anti-reduction agents, evaporation accelerators, chelating agents, and polymers other than the above polyurethane polymer may be contained in the ink of the present exemplary embodiment as needed.

[Ink Cartridge]

The ink cartridge of the present exemplary embodiment has an ink storage portion in which the ink is stored, and stores the ink of the present exemplary embodiment described above in the ink storage portion. In the ink cartridge, the ink storage portion is composed of an ink storage room in which a liquid ink is stored and a negative pressure generation member housing room in which a negative pressure generation member that retains the ink inside thereof with negative pressure is stored. The ink cartridge may be an ink cartridge retaining a total amount of a housed amount with the negative pressure generation member without having the ink storage room in which the liquid ink is stored. Further, the ink cartridge may be an ink cartridge configured so as to have the ink storage room and the recording head.

[Inkjet Recording Method]

The inkjet recording method of the present exemplary embodiment is an inkjet recording method in which the ink is discharged from the recording head by giving thermal energy to the ink, and the ink of the present exemplary embodiment described above is used. The "recording" in the present exemplary embodiment includes aspects of recording on a recording medium using the ink of the present exemplary embodiment and aspects of printing on a non-permeable substrate such as a glass, a plastic and a film using the ink of the present exemplary embodiment. The recording medium includes plain papers and so-called gloss papers comprising a porous ink receiving layer containing an inorganic pigment and a binder on an air-permeable support (paper and the like). In the present exemplary embodiment, when the ink of the present exemplary embodiment is used on the plain paper, the effect of the present invention is exerted particularly, which is thus desirable.

FIG. 1 is a perspective view illustrating a machinery section of the inkjet recording apparatus. When the paper is supplied, first predetermined sheets of the recording medium in a paper supply section including a paper supply tray are fed to a nip portion composed of a paper supply roller and a separation roller. The recording media are separated at the nip portion, and only the recording medium located on a topmost is fed. The recording medium sent to a feeding section is guided by a pinch roller holder M3000 and a paper guide flapper and sent to a roller pair of a feeding roller M3060 and a pinch roller M3070. The roller pair composed of the feeding roller M3060 and the pinch roller M3070 is rotated by driving a line feed (LF) motor, and the recording medium is fed on a platen M3040 by this rotation.

When an image is formed, a carriage section arranges the recording head in a target position for image formation, and discharges the ink on the recording medium according to signals from an electric substrate. In the inkjet recording apparatus, the image is formed on the recording medium by alternately repeating a main scanning in which the carriage M4000 scans in a column direction while the recording is performed by the recording head and a vertical scanning in which the recording medium is fed in a row direction by the feeding roller M3060. Finally, the recording medium on which the image has been formed is inserted into a nip of a first paper discharging roller M3110 and a spur, fed and discharged onto a paper discharge tray.

Figure 2:
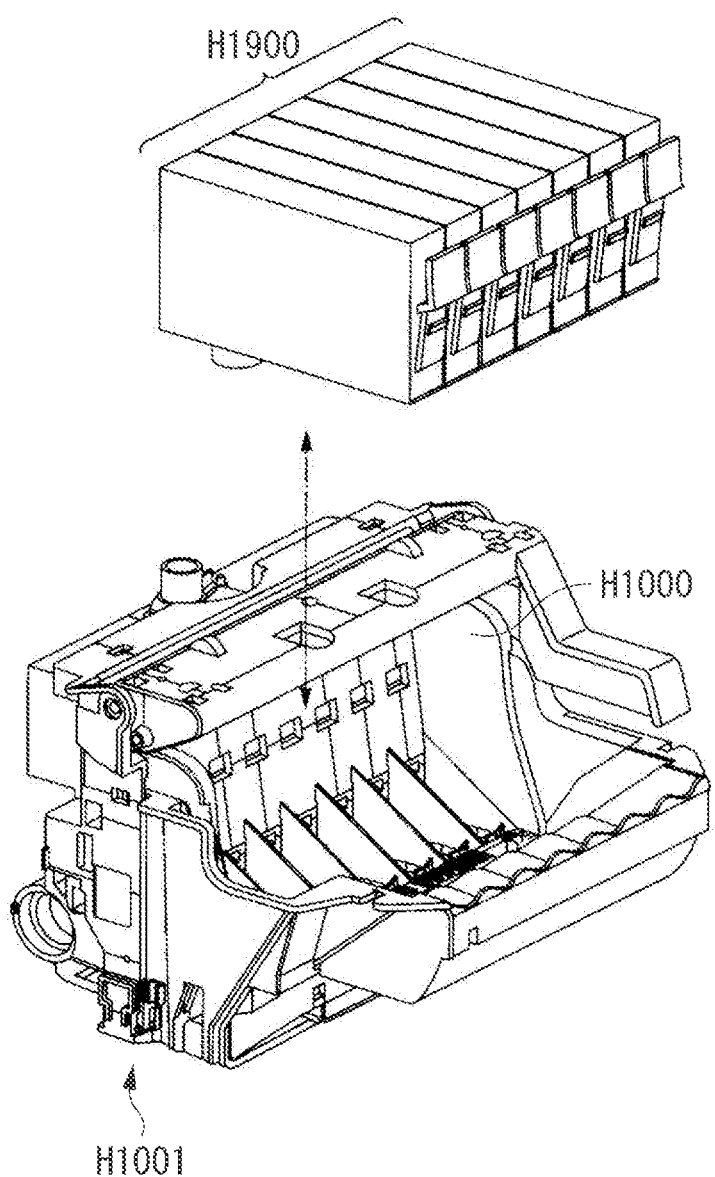
FIG. 2 is a perspective view illustrating a state where an ink cartridge is mounted in a head cartridge.

FIG. 2 is a perspective view illustrating a state where an ink cartridge H1900 is mounted in a head cartridge H1000. The inkjet recording apparatus of the present exemplary embodiment forms an image by respective yellow, magenta, cyan, black, light magenta, light cyan, and green inks. Therefore, the ink cartridge H1900 is independently prepared for seven colors. In above, the ink of the present exemplary embodiment is used as at least one ink. As illustrated in FIG. 2, each ink cartridge H1900 is freely removable from the head cartridge H1000. The ink cartridge H1900 can be attached and removed in the state where the head cartridge H1000 has been mounted in the carriage M5000.

The present invention will be described in detail below with reference to Examples and Comparative Examples. The present invention is not restricted to the following Examples in the range within the scope thereof. In the description in the following Example, a "part" is based on the mass unless otherwise indicated.

<Preparation of Polyurethane Polymer Dispersion>

Polyol (B part) was thoroughly stirred and dissolved in methyl ethyl ketone, then polyisocyanate (A part) and diol having an acid group (C part) were added thereto, and the mixture was reacted at 75° C. for one hour to obtain a urethane prepolymer solution. Then, the obtained urethane prepolymer solution was cooled to 60° C., an aqueous solution of potassium hydroxide was added to neutralize a carboxyl group, and subsequently the mixture was cooled to 40° C. Ion exchange water was added thereto, and the mixture was emulsified by stirring at high speed using a homomixer. After the emulsification, a chain extender (D part) was added, and a chain extension reaction was carried out at 30° C. for 12 hours. When the presence of an isocyanate group was not identified by FT-IR, methyl ethyl ketone was distilled off from this polymer solution by heating under reduced pressure to yield a polyurethane polymer dispersion in which a content of a polyurethane polymer was 20.0% and a weight average molecular weight was 30,000. Using the obtained polyurethane polymer dispersion, an acid value of the polyurethane polymer was determined by potential difference titration using a potassium hydroxide methanol titration solution. A preparation condition and a characteristic of each polyurethane polymer dispersion are shown in Table 2. Abbreviations in the tables are as follows.

IPDI: Isophorone diisocyanate
PPG: Polypropylene glycol (number average molecular weight: 2,000)
PTMG: Polytetramethylene glycol (number average molecular weight: 2,000)
PC: Polycarbonate polyol (number average molecular weight: 2,000)
PES: Polyester polyol (number average molecular weight: 2,000)
DMPA: Dimethylol propionate
EDA: Ethylenediamine

TABLE 2

Preparation conditions and characteristics of polyurethane polymer dispersions

| Polyurethane polymer dispersion | Preparation condition | | | | | |
|---|---|---|---|---|---|---|
| | Polyisocyanate | | Polyol | | Diol having acid group | |
| No. | Type | A part | Type | B part | Type | C part |
| PU-1 | IPDI | 46.9 | PPG | 31.6 | DMPA | 21.5 |
| PU-2 | IPDI | 27.5 | PPG | 61.7 | DMPA | 9.6 |
| PU-3 | IPDI | 61.5 | PPG | 5.0 | DMPA | 33.5 |
| PU-4 | IPDI | 27.5 | PPG | 67.4 | DMPA | 7.2 |
| PU-5 | IPDI | 62.5 | PPG | 1.7 | DMPA | 35.8 |
| PU-6 | IPDI | 46.9 | PTMG | 31.6 | DMPA | 21.5 |
| PU-7 | IPDI | 46.9 | PC | 31.6 | DMPA | 21.5 |
| PU-8 | IPDI | 46.9 | PES | 31.6 | DMPA | 21.5 |

| Polyurethane polymer dispersion | Preparation condition Chain extender | | Characteristic Acid value |
|---|---|---|---|
| No. | Type | D part | (mg KOH/g) |
| PU-1 | EDA | 2.1 | 90.0 |
| PU-2 | EDA | 1.3 | 40.0 |
| PU-3 | EDA | 1.5 | 140.0 |
| PU-4 | EDA | 1.1 | 30.0 |
| PU-5 | EDA | 1.1 | 150.0 |
| PU-6 | EDA | 2.1 | 90.0 |
| PU-7 | EDA | 2.1 | 90.0 |
| PU-8 | EDA | 2.1 | 90.0 |

<Preparation of Pigment Dispersion A>

20 g of Black Pearls 880 (manufactured by Cabot) having a specific surface area of 220 $m^2/g$, 11.0 mmol of ((4-aminobenzoylamino)-methane-1,1-diyl)bisphosphonate sodium salt, 20.0 mmol of nitric acid, and 200 mL of pure water were mixed at room temperature using a Silverson mixer at 6,000 rpm. After 30 minutes, 20.0 mmol of sodium nitrite in a small amount was added to this mixture, and the mixture was further mixed. When a temperature reached 60° C. by the addition and the mixing, the mixture was mixed in this state for one hour to obtain a self-dispersing carbon black dispersion. Subsequently, pH was adjusted to 10.0 with an aqueous solution of potassium hydroxide. After 30 minutes, the modified carbon black dispersion was ultrafiltrated using 20 parts of pure water. Further, water was added to the obtained self-dispersing carbon black to disperse so that the content of the pigment was 10.0% by mass to prepare a dispersion. A pigment dispersion A in which the self-dispersing carbon black, particle surfaces of which a bisphosphonate group, a counter ion of which was potassium, was bound to via the other atomic group was dispersed in water was obtained by the aforementioned method. A surface charge amount of the self-dispersing carbon black was measured by the aforementioned method, and was 0.38 mmol/g. In the pigment dispersion A prepared above, the content of the pigment was 10.0% by mass, pH was 10.0, and an average particle diameter of the pigment was 120 nm.

(Preparation of Pigment Dispersion B)

To a solution in which 5 g of a concentrated hydrochloric acid had been dissolved in 5.5 g of water, 1.5 g of 4-amino-1,2-benzenedicarboxylic acid was added at 5° C. Subsequently, this solution was always kept at 10° C. or below by placing a container in which this solution was added in an ice bath. A solution in which 1.8 g of sodium nitrite had been dissolved in 9 g of water at 5° C. was added thereto. The resulting solution was stirred for additional 15 minutes, and then 6 g of carbon black having a specific surface area of 220 $m^2/g$ and DBP oil absorption amount of 105 mL/100 g was added under stirring. Subsequently, the mixture was further stirred for 15 minutes, the resulting slurry was filtrated through a filter paper (brand name: filter paper for standard No. 2 manufactured by Adventace), and particles were thoroughly washed with water. These particles were dried in an oven at 110° C. to prepare self-dispersing carbon black. Water was added to the resulting self-dispersing carbon black, which was then dispersed so that the content of the pigment was 10.0% to prepare a dispersion. The pigment dispersion in which the self-dispersing carbon black, particle surfaces of which a —$C_6H_3$—$(COONa)_2$ group was introduced into was dispersed in the water was obtained by the aforementioned method. Subsequently a pigment dispersion B in which the self-dispersing carbon black, particle surfaces of which a benzenedicarboxylate group, a counter ion of which was potassium, was bound to was dispersed was obtained by substituting sodium ion in the pigment dispersion with potassium ion using an ion exchange method. The surface charge amount of the self-dispersing carbon black was measured by the aforementioned method, and was 0.37 mmol/g. In the pigment dispersion B prepared above, the content of the pigment was 10.0% by mass, pH was 10.0, and the average particle diameter of the pigment was 120 nm.

(Preparation of Pigment Dispersion C)

A styrene/acrylic acid copolymer having an acid value of 200 mg KOH/g and the weight average molecular weight of 10,000 was neutralized with the aqueous solution of 10% by mass potassium hydroxide. Then, 10 parts of carbon black having the specific surface area of 210 $m^2/g$ and the DBP oil absorption amount of 74 mL/100 g, 20 parts of the neutralized styrene/acrylic acid copolymer (solid content), and 70 parts of water were mixed. This mixture was dispersed for one hour using a sand grinder, then centrifuged to remove rough large particles, and filtrated with pressure through a microfilter having a pore size of 3.0 μm (manufactured by FUJIFILM Corporation). A pigment dispersion C in which the carbon black was dispersed in the water with the polymer was obtained by the aforementioned method. In the pigment dispersion C, the content of the pigment was 10.0% by mass, the content of the polymer was 20.0% by mass, pH was 10.0, and the average particle diameter of the pigment was 120 nm.

<Preparation of Ink>

(Preparation of Inks 1 to 22)

The pigment dispersion and the polyurethane polymer dispersion obtained above were mixed with the following ingredients in combination shown in Table 3. A residual quantity in ion exchange water indicates an amount required to make a sum amount of all ingredients that compose the ink 100.0% by mass.

| | |
|---|---|
| Pigment dispersion (the content of the pigment is 10.0% by mass) | 30.0% by mass |
| Polyurethane polymer dispersion (the content of the polymer was 20.0% by mass) | 7.5% by mass |
| Polyethylene glycol | See Table 3 |
| Glycerin | 9.0% by mass |
| Diethylene glycol | 5.0% by mass |
| Triethylene glycol | 5.0% by mass |
| Acetylenol E100 (manufactured by Kawaken Fine Chemicals Co., Ltd.) | 0.1% by mass |
| Ion exchange water | Residual quantity |

These were thoroughly stirred and dispersed, and then filtrated with pressure through a microfilter having a pore size of 3.0 μm (manufactured by FUJIFILM Corporation) to prepare each ink.

TABLE 3

Preparation conditions of inks

| Ink No. | Pigment dispersion No. | Polyurethane polymer dispersion No. | Polyethylene glycol Number average molecular weight | Polyethylene glycol Content (% by mass) |
|---|---|---|---|---|
| Ink 1 | A | PU-1 | 1000 | 0.30 |
| Ink 2 | A | PU-2 | 1000 | 0.30 |
| Ink 3 | A | PU-3 | 1000 | 0.30 |
| Ink 4 | A | PU-1 | 1000 | 0.15 |
| Ink 5 | A | PU-1 | 1000 | 3.00 |
| Ink 6 | A | PU-1 | 500 | 0.30 |
| Ink 7 | A | PU-1 | 500 | 0.15 |
| Ink 8 | A | PU-1 | 3000 | 0.15 |
| Ink 9 | A | PU-6 | 1000 | 0.30 |
| Ink 10 | A | PU-7 | 1000 | 0.30 |
| Ink 11 | A | PU-8 | 1000 | 0.30 |
| Ink 12 | A | PU-1 | 400 | 0.15 |
| Ink 13 | A | PU-1 | 4000 | 0.15 |
| Ink 14 | A | PU-1 | 400 | 3.00 |
| Ink 15 | A | PU-1 | 400 | 0.14 |
| Ink 16 | A | PU-1 | 400 | 3.10 |
| Ink 17 | A | PU-5 | 1000 | 0.30 |
| Ink 18 | B | PU-1 | 1000 | 0.30 |
| Ink 19 | A | PU-4 | 1000 | 0.30 |
| Ink 20 | A | PU-1 | — | 0 |
| Ink 21 | C | PU-1 | — | 0 |
| Ink 22 | A | — | — | 0 |

(Preparation of Ink 23)
The following ingredients were mixed.

| | |
|---|---|
| Pigment dispersion A (the content of the pigment is 10.0% by mass) | 30.0% by mass |
| Polyurethane polymer dispersion PU-1 (the content of the polymer was 20.0% by mass) | 7.5% by mass |
| Glycerin | 9.0% by mass |
| Diethylene glycol | 5.0% by mass |
| Triethylene glycol | 5.0% by mass |
| Acetylenol E100 (manufactured by Kawaken Fine Chemicals Co., Ltd.) | 0.1% by mass |
| New Pole PE-62 (manufactured by Sanyo Chemical Industries Ltd.) [Ethylene oxide/propylene oxide block copolymer surfactant] | 0.3% by mass |
| Ion exchange water | 43.1% by mass |

These were thoroughly stirred and dispersed, and then filtrated with pressure through a microfilter having a pore size of 3.0 μm (manufactured by FUJIFILM Corporation) to prepare the ink 23.

<Evaluation>

In the present exemplary embodiment, desirable levels were represented by AA to B, and unacceptable levels were represented by C and D in evaluation criteria in following each evaluation parameter. The following each evaluation was carried out using an inkjet recording apparatus PIXUS ip3100 (manufactured by Canon Inc.). A condition for recording was as follows; temperature: 23° C., relative humidity: 55%, and discharged amount per droplet: 28 ng (within ±10%). In this inkjet recording apparatus, a recording duty was defined to be 100% on an image recorded under a condition where one drop of about 28 ng ink was given on a unit area of 1/600 inch×1/600 inch with a resolution of 600 dpi×600 dpi.

(Discharge Stability of Ink)

An ink cartridge was filled with each ink obtained above, and mounted in the inkjet recording apparatus modified so that a moving speed of a carriage was 40 inches/seconds. And, an image of vertical ruled lines formed with 4 dots was recorded on PPC paper CF-500 (manufactured by Canon Inc.) (image before a discharge test). Then, a solid image of 19 cm×26 cm (image with a recording duty of 100%) was recorded on 10 sheets of the paper, and subsequently, the image of the vertical ruled lines formed with 4 dots was recorded (image after a first discharge test). Further, after the same discharge test was carried out, the image of the vertical ruled lines formed with 4 dots was recorded (image after a second discharge test). The discharge stability of the ink was evaluated by measuring raggedness of the vertical ruled lines using a personal image quality evaluation system, Personal IAS (manufactured by Quality Engineering Associates) and further visually observing the image of the vertical rules lines on the images before and after the first discharge test and the images before and after the second discharge test. The smaller the difference between raggedness values of the vertical ruled lines before and after the discharge test is, it is evaluated that the higher the discharge stability of the ink is. Evaluation criteria for the discharge stability of the ink are as follows. Evaluation results are shown in Table 4.

AA: The difference between the raggedness values before and after the discharge test was less than 2, and no change was observed at all on the images of the vertical ruled lines.

A: The difference between the raggedness values before and after the discharge test was 2 or more and less than 4, and the change on the images of the vertical ruled lines was not identified.

B: The difference between the raggedness values before and after the discharge test was 4 or more and less than 6, and the image of the vertical ruled lines was slightly changed.

C: The difference between the raggedness values before and after the discharge test was 6 or more, and the image of the vertical ruled lines was obviously changed.

D: White stripes and faint print were observed on the solid image in the discharge test.

(Optical Density of Image)

An ink cartridge was filled with each ink obtained above, and mounted in the above inkjet recording apparatus. And a solid image of 2 cm×2 cm (image of recording duty 100%) was recorded on 4 types of recording media, i.e., PPC paper GF-500 (manufactured by Canon Inc.), PPC paper 4024 (manufactured by Xerox), PPC paper bright white (manufactured by Hewlett Packard), and PPC paper hammer mill jet print (manufactured by International Paper). After leaving the resulting solid image for one day, the optical density of the image was measured using a reflected density meter (brand name: Macbeth RD-918 manufactured by Macbeth), and evaluated. Evaluation criteria for the optical density of the image are as follows. Evaluation results are shown in Table 4.

AA: The average of the optical densities of the images on the four types of the recording media was 1.45 or more.

A: The average of the optical densities of the images on the four types of the recording media was 1.4 or more and less than 1.45.

B: The average of the optical densities of the images on the four types of the recording media was 1.3 or more and less than 1.4.

C: The average of the optical densities of the images on the four types of the recording media was less than 1.3.

(Scratch Resistance of Image)

An ink cartridge was filled with each ink obtained above, and mounted in the above inkjet recording apparatus. Then, a solid image of 1.0 inch×0.5 inch (image of recording duty 100%) was recorded on PPC paper GF-500 (manufactured by Canon Inc.). Lens-cleaning paper and a weight having a surface pressure of 40 g/cm$^2$ were placed on the solid image 10 minutes and one day after the recording, the solid image and the lens-cleaning paper were abraded. Subsequently, the lens-cleaning paper and the weight were removed, and a stained degree on the solid image and transfer of the solid image on a white part on the lens-cleaning paper were observed visually. Evaluation criteria for the scratch resistance of the image are as follows. Evaluation results are shown in Table 4.

AA: No stain on the white part was observed after 10 minutes and after one day.

A: The stain was slightly detected on the white part after 10 minutes. No stain on the white part was observed after one day.

B: The stain was detected on the white part after 10 minutes, but its level was not noticeable. No stain on the white part was observed after one day.

C: The stain on the white part was detected after 10 minutes and after one day.

(Highlighter Resistance on Image)

An ink cartridge was filled with each ink obtained above, and mounted in the inkjet recording apparatus. A vertical ruled line with a thickness of 1/10 inch was recorded on PPC paper GF-500 (manufactured by Canon Inc.). Five minutes and one day after the recording, a marking was given onto the recorded vertical rules line using a yellow line marker OPTEX2 (manufactured by ZEBRA Co., Ltd.) and immediately after that, the marking was given to a white part on the recording medium using the same marker. Then, contamination of a marker tip and contamination of the marking on the white part were identified. Evaluation criteria for the highlighter resistance on the image are as follows. Evaluation results are shown in Table 4.

AA: After 5 minutes and after one day, no contamination of the marker tip with coloration was observed and no contamination occurred even when the marking was given to the white part.

A: After 5 minutes, the contamination of the marker tip with coloration was observed, but the contamination was scarcely observed when the marking was given to the white part. After one day, neither contamination of the marker tip with the coloration nor contamination when the marking was given to the white part was observed.

B: After 5 minutes and after one day, the marker tip was slightly contaminated with the coloration, but the contamination was scarcely observed when the marking was given to the white part.

C: After 5 minutes and after one day, the marker tip was contaminated with the coloration, and the contamination occurred when the marking was given to the white part.

TABLE 4

Evaluation results

| Example No. | Ink No. | Discharge stability of ink — Comparison of images before & after 1st discharge test | Discharge stability of ink — Comparison of images before & after 2nd discharge test | Optical density of image |
|---|---|---|---|---|
| Example 1 | Ink 1 | AA | AA | AA |
| Example 2 | Ink 2 | AA | AA | AA |
| Example 3 | Ink 3 | AA | AA | AA |
| Example 4 | Ink 4 | AA | AA | AA |
| Example 5 | Ink 5 | AA | AA | AA |
| Example 6 | Ink 6 | AA | AA | AA |
| Example 7 | Ink 7 | AA | AA | AA |
| Example 8 | Ink 8 | AA | AA | AA |
| Example 9 | Ink 9 | AA | A | AA |
| Example 10 | Ink 10 | A | A | AA |
| Example 11 | Ink 11 | A | A | AA |
| Example 12 | Ink 12 | AA | A | AA |
| Example 13 | Ink 13 | AA | A | AA |
| Example 14 | Ink 14 | AA | A | AA |
| Example 15 | Ink 15 | A | A | AA |
| Example 16 | Ink 16 | A | A | AA |
| Example 17 | Ink 17 | AA | AA | AA |
| Example 18 | Ink 18 | AA | AA | A |
| Comparative Example 1 | Ink 19 | D | D | AA |
| Comparative Example 2 | Ink 20 | B | C | AA |
| Comparative Example 3 | Ink 23 | B | C | C |
| Reference Example 1 | Ink 21 | AA | AA | C |
| Reference Example 2 | Ink 22 | A | A | AA |

| Example No. | Ink No. | Scratch resistance of image | Highlighter resistance on image |
|---|---|---|---|
| Example 1 | Ink 1 | AA | AA |
| Example 2 | Ink 2 | AA | AA |
| Example 3 | Ink 3 | AA | AA |
| Example 4 | Ink 4 | AA | AA |
| Example 5 | Ink 5 | AA | AA |
| Example 6 | Ink 6 | AA | AA |
| Example 7 | Ink 7 | AA | AA |
| Example 8 | Ink 8 | AA | AA |
| Example 9 | Ink 9 | AA | AA |
| Example 10 | Ink 10 | A | A |
| Example 11 | Ink 11 | A | A |
| Example 12 | Ink 12 | AA | AA |
| Example 13 | Ink 13 | AA | AA |
| Example 14 | Ink 14 | AA | AA |
| Example 15 | Ink 15 | AA | AA |
| Example 16 | Ink 16 | AA | AA |
| Example 17 | Ink 17 | B | B |
| Example 18 | Ink 18 | AA | AA |
| Comparative Example 1 | Ink 19 | AA | AA |
| Comparative Example 2 | Ink 20 | AA | AA |
| Comparative Example 3 | Ink 23 | AA | AA |
| Reference Example 1 | Ink 21 | AA | AA |
| Reference Example 2 | Ink 22 | C | C |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-107782 filed May 9, 2012, which is hereby incorporated by reference herein in its entirety.

What is claimed is:

1. An ink used for an inkjet recording method for discharging the ink from a recording head by an action of thermal energy, the ink comprising:
    self-dispersing carbon black, a polyurethane polymer having an acid value of 40 mg KOH/g or more, and polyethylene glycol,
    wherein a content (% by mass) of the polyethylene glycol is 0.10 time or more and 2.00 times or less relative to a content (% by mass) of the polyurethane polymer based on a total mass of the ink.

2. The ink according to claim 1, wherein the polyurethane polymer has units each derived from polyisocyanate, polyether polyol, and diol having an acid group.

3. The ink according to claim 2, wherein the polyether polyol is polypropylene glycol.

4. The ink according to claim 1, wherein the polyethylene glycol has a number average molecular weight of 500 or more and 3,000 or less.

5. The ink according to claim 1, wherein the self-dispersing carbon black is self-dispersing carbon black, a surface of which a phosphonate group is bound to directly or via another atomic group.

6. An ink cartridge having an ink storage portion in which an ink is stored,
    wherein the ink stored in the ink storage portion is the ink according to claim 1.

7. An inkjet recording method for discharging an ink from a recording head by an action of thermal energy,
    wherein the ink is the ink according to claim 1.

8. An ink used for an inkjet recording method for discharging the ink from a recording head by an action of thermal energy, the ink comprising:
    self-dispersing carbon black, a polyurethane polymer having an acid value of 40 mg KOH/g or more, and polyethylene glycol,
    wherein a content (% by mass) of the polyethylene glycol is 0.10 time or more and 2.00 times or less relative to a content (% by mass) of the polyurethane polymer based on a total mass of the ink.

9. The ink according to claim 8, wherein the polyurethane polymer has units each derived from polyisocyanate, polyether polyol, and diol having an acid group.

10. The ink according to claim 9, wherein the polyether polyol is polypropylene glycol.

11. The ink according to claim 8, wherein the polyethylene glycol has a number average molecular weight of 500 or more and 3,000 or less.

12. An ink used for an inkjet recording method for discharging the ink from a recording head by an action of thermal energy, the ink comprising:
    self-dispersing carbon black, a polyurethane polymer having an acid value of 40 mg KOH/g or more, and polyethylene glycol,
    wherein the self-dispersing carbon black is self-dispersing carbon black, a surface of which a phosphonate group is bound to directly or via another atomic group.

13. The ink according to claim 12, wherein the polyurethane polymer has units each derived from polyisocyanate, polyether polyol, and diol having an acid group.

14. The ink according to claim 13, wherein the polyether polyol is polypropylene glycol.

15. The ink according to claim 12, wherein the polyethylene glycol has a number average molecular weight of 500 or more and 3,000 or less.

* * * * *